United States Patent
Nishida

(10) Patent No.: US 9,885,390 B2
(45) Date of Patent: Feb. 6, 2018

(54) SLIDING SHAFT AND STEERING DEVICE

(71) Applicant: JTEKT CORPORATION, Osaka-shi, Osaka (JP)

(72) Inventor: Tomoya Nishida, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 132 days.

(21) Appl. No.: 14/903,402

(22) PCT Filed: Jul. 17, 2014

(86) PCT No.: PCT/JP2014/068997
§ 371 (c)(1),
(2) Date: Jan. 7, 2016

(87) PCT Pub. No.: WO2015/008818
PCT Pub. Date: Jan. 22, 2015

(65) Prior Publication Data
US 2016/0153501 A1     Jun. 2, 2016

(30) Foreign Application Priority Data

Jul. 18, 2013   (JP) .................................. 2013-149610

(51) Int. Cl.
| | |
|---|---|
| *F16C 3/03* | (2006.01) |
| *F16D 3/06* | (2006.01) |
| *B62D 1/16* | (2006.01) |
| *B62D 1/20* | (2006.01) |
| *C08L 77/06* | (2006.01) |

(52) U.S. Cl.
CPC .................. *F16D 3/06* (2013.01); *B62D 1/16* (2013.01); *B62D 1/20* (2013.01); *C08L 77/06* (2013.01); *F16C 3/03* (2013.01); *F16D 2300/10* (2013.01)

(58) Field of Classification Search
CPC .......... F16C 3/03; F16D 3/06; F16D 2300/10; C08L 77/06; B62D 1/16; B62D 1/20
USPC ................. 464/16, 162, 8; 403/359.1–359.6; 427/185, 195; 180/443, 444
See application file for complete search history.

(56) References Cited

U.S. PATENT DOCUMENTS 5,114,521 A * 5/1992 Isegawa .................... F16C 3/03
8,262,484 B2 * 9/2012 Nakatani .................. B62D 1/16
                                                                        464/16
(Continued)

FOREIGN PATENT DOCUMENTS

| JP | H11-99355 A | 4/1999 |
| JP | 2004-323583 A | 11/2004 |

(Continued)

OTHER PUBLICATIONS

PolymerProcessing.com, nylon-6,10, 2001 [retrieved on Jun. 28, 2017] Retrieved from the Internet: <http://www.polymerprocessing.com/polymers/PA610.html>.*

(Continued)

*Primary Examiner* — Gregory J Binda
(74) *Attorney, Agent, or Firm* — Oliff PLC

(57) ABSTRACT

In a sliding shaft, an outer circumferential surface of a male shaft is coated with a resin coating layer formed by a fluidized bed powder coating method by using a powder coating material containing a base resin and an aliphatic compound. A steering device includes this sliding shaft as an intermediate shaft transmitting steering force.

5 Claims, 5 Drawing Sheets

(56) References Cited

U.S. PATENT DOCUMENTS 9,618,052 B2 * 4/2017 Miyake .................. F16D 3/06
2010/0132499 A1 6/2010 Nakatani et al.

FOREIGN PATENT DOCUMENTS

| JP | 2005-220208 A | 8/2005 |
| JP | 4033453 B2 | 1/2008 |
| JP | 2008-222016 A | 9/2008 |
| JP | 2011-173464 A | 9/2011 |
| JP | 4849740 B2 | 1/2012 |
| JP | 2013-028343 A | 2/2013 |

OTHER PUBLICATIONS

Oct. 7, 2014 International Search Report issued in International Patent Application No. PCT/JP2014/068997.

* cited by examiner

SLIDING SHAFT AND STEERING DEVICE

TECHNICAL FIELD

The present invention relates to a sliding shaft including a male shaft and a female shaft connected to each other slidably along the axial direction, and a steering device for a vehicle including the sliding shaft as an intermediate shaft transmitting steering force.

BACKGROUND ART

An intermediate shaft of a steering device for a vehicle includes a sliding shaft in which, for example, a male shaft and a cylindrical female shaft are connected to each other to be expandable/contractible along the axial direction through engagement of splines (spline fitting) or the like. An outer circumferential surface of the male shaft or an inner circumferential surface of the female shaft including the spline is coated with a resin coating layer in some cases in order to fill a clearance between these shafts to reduce rattling noise or reduce backlash of a steering wheel occurring in a steering operation (see, for example, Patent Reference 1).

As one of methods for forming a resin coating layer, a fluidized bed powder coating method is known. Since no organic solvent is used in the fluidized bed powder coating method, this method has an advantage of low environmental load.

In the fluidized bed powder coating method, a powder coating material containing a base resin corresponding to a raw material of a resin coating layer is first prepared, and in a fluidized bed, the powder coating material is placed in a floating and fluidized state by blowing air or the like.

Subsequently, a male shaft or a female shaft, having been heated to a temperature equal to or higher than the melting point of the base resin, is dipped in the floating and fluidized powder coating material, and thus, the powder coating material is deposited, and allowed to melt and flow, on the outer circumferential surface of the male shaft or the inner circumferential surface of the female shaft (hereinafter sometimes generically referred to as the "deposited surface"), and then is solidified when the resultant is cooled thereafter, resulting in forming a resin coating layer on the deposited surface.

As the base resin corresponding to a raw material of the powder coating material, polyamide 11, polyamide 12 or the like is suitably used because such a resin can form a resin coating layer excellent in flowability when melted, and excellent also in the sliding property and the like.

PRIOR ART REFERENCE

Patent Reference

Patent Reference 1: JP-A-2008-222016

SUMMARY OF THE INVENTION

Problem that the Invention is to Solve

Recently, it has been desired that an intermediate shaft provided in a vehicle cabin can be also provided within, for example, an engine room having a high temperature, and for this purpose, it has been necessary to make a resin coating layer highly heat resistant.

Therefore, for example, polyamide 610 or the like that is more excellent in the heat resistance than a currently used resin and is excellent also in the friction/wear property, the sliding property and the like is being examined to be used as the base resin.

Polyamide 610 has, however, a problem in which it is not smoothly melted and flown because it has a high viscosity when melted and has a low throwing power after deposition.

Therefore, in the fluidized bed powder coating method, while a powder coating material is deposited in a large thickness on, for example, a tip surface of a spline so that a resin coating layer having a sufficient thickness can be formed, it is apprehended that there arises a problem in which the resin coating layer having a sufficient thickness cannot be formed on an inner surface of a tooth space between splines where the powder coating material is difficult to enter.

In order to solve this problem, examination was made on selective use, for example, as polyamide 610, of one having a small molecular weight and more easily melted and flown, but in this case, the wear resistance of a resultant resin coating layer is lowered, and there arises a problem in which backlash is easily caused due to the wear.

An object of the present invention is to provide a sliding shaft having a resin coating layer that is formed, by the fluidized bed powder coating method, to have a sufficient thickness even on, for example, an inner surface of a tooth space between splines where a powder coating material is difficult to enter, and is excellent also in wear resistance.

Another object of the present invention is to provide a steering device including such a sliding shaft as an intermediate shaft.

Means for Solving the Problem

In order to solve the above-described problems, the present invention provides a sliding shaft comprising a male shaft and a cylindrical female shaft connected to each other slidably along an axial direction, an outer circumferential surface of the male shaft or an inner circumferential surface of the female shaft being coated with a resin coating layer, wherein the resin coating layer is formed, by a fluidized bed powder coating method, by using a powder coating material, the powder coating material containing:

a base resin; and at least one aliphatic compound selected from a group including: a fatty acid having 14 or more carbon atoms or a derivative thereof; a higher alcohol having 18 or more carbon atoms; an aliphatic amine having 14 or more carbon atoms; and an ester-based wax of a fatty acid having 14 or more carbon atoms.

According to the present invention, since any of the aforementioned aliphatic compounds is contained in the powder coating material, even if the used power coating contains, as the base resin, polyamide 610 with a large molecular weight that cannot be smoothly melted and flown because it has a high viscosity when melted and has a low throwing power after deposition, the viscosity of the powder coating material when melted can be lowered to improve the flowability.

This is probably because either of these aliphatic compounds has a similar polarity to the base resin such as polyamide and hence is easily and homogeneously compatible with the base resin, so as to reduce the internal friction between molecules of the base resin.

Therefore, the resin coating layer having a sufficient thickness can be formed on a portion where a powder coating material is difficult to enter in the fluidized bed powder coating method, such as an inner surface of a tooth space between splines.

Besides, when any of the aliphatic compounds is contained in the powder coating material, a coefficient of friction of the resin coating layer against a mating surface made of a metal such as iron in particular, for example, against the inner circumferential surface of the female shaft if the resin coating layer is formed on the outer circumferential surface of the male shaft, is lowered to improve the wear resistance, and furthermore the sliding property of the resin coating layer.

This is probably because all of these aliphatic compounds have a strong polar group and hence physically or chemically adsorb onto the mating surface satisfactorily, and have a long hydrocarbon chain excellent in the affinity and compatibility with the resin coating layer and hence form a lubricating film having a good lubricating property between the surface of the resin coating layer and the mating surface.

In other words, it can be said that the effect of reducing the internal friction and the effect of lowering a coefficient of friction against a mating member are both derived from the good lubricating property of the specific aliphatic compounds described above.

The powder coating material preferably contains the aliphatic compound in a ratio of 0.05% by mass or more and 0.5% by mass or less based on an amount of the base resin.

If the mixing ratio of the aliphatic compound is smaller than this range, it is apprehended that the effects, attained by mixing the aliphatic compound, of improving the flowability of the powder coating material when melted and of improving the wear resistance and the sliding property of the resin coating layer cannot be sufficiently attained. On the other hand, if the ratio exceeds the range, not only an excessive effect cannot be attained but also it is apprehended that the wear resistance and the strength of the resin coating layer are lowered on the contrary.

In consideration of providing the resin coating layer with a good sliding property and the like, the base resin is preferably polyamide.

In particular, in consideration of providing the resin coating layer with high heat resistance and the like sufficient for use in an engine room, where the ambient temperature is, for example, continuously 120° C. and may instantaneously reach 150° C., the base resin is preferably polyamide 610.

Particularly, in the case where polyamide 610 having a large molecular weight is used as the base resin as described above, since the polyamide 610 itself is excellent in wear resistance, the wear resistance of the resin coating layer can be further improved. Besides, the creep resistance of the resin coating layer can be also improved.

The constitution of the present invention is applicable to a sliding shaft in which splines to be engaged with each other are formed on the outer circumferential surface of the male shaft and the inner circumferential surface of the female shaft so that the male shaft and the female shaft are connected to each other to be expandable/contractible along the axial direction through the engagement of the splines.

The present invention provides a steering device including the above-described sliding shaft of the present invention as an intermediate shaft transmitting steering force.

According to the present invention, the resin coating layer is formed on the outer circumferential surface of the male shaft or the inner circumferential surface of the female shaft included in the sliding shaft serving as the intermediate shaft to fill a clearance between these shafts, and therefore, rattling noise can be reduced and backlash occurring in a steering operation can be reduced.

Besides, particularly when polyamide 610 is used for forming the resin coating layer to improve the heat resistance, a steering device of a type in which the intermediate shaft is provided within an engine room can be constituted.

MODE FOR CARRYING OUT THE INVENTION

Figure 1:
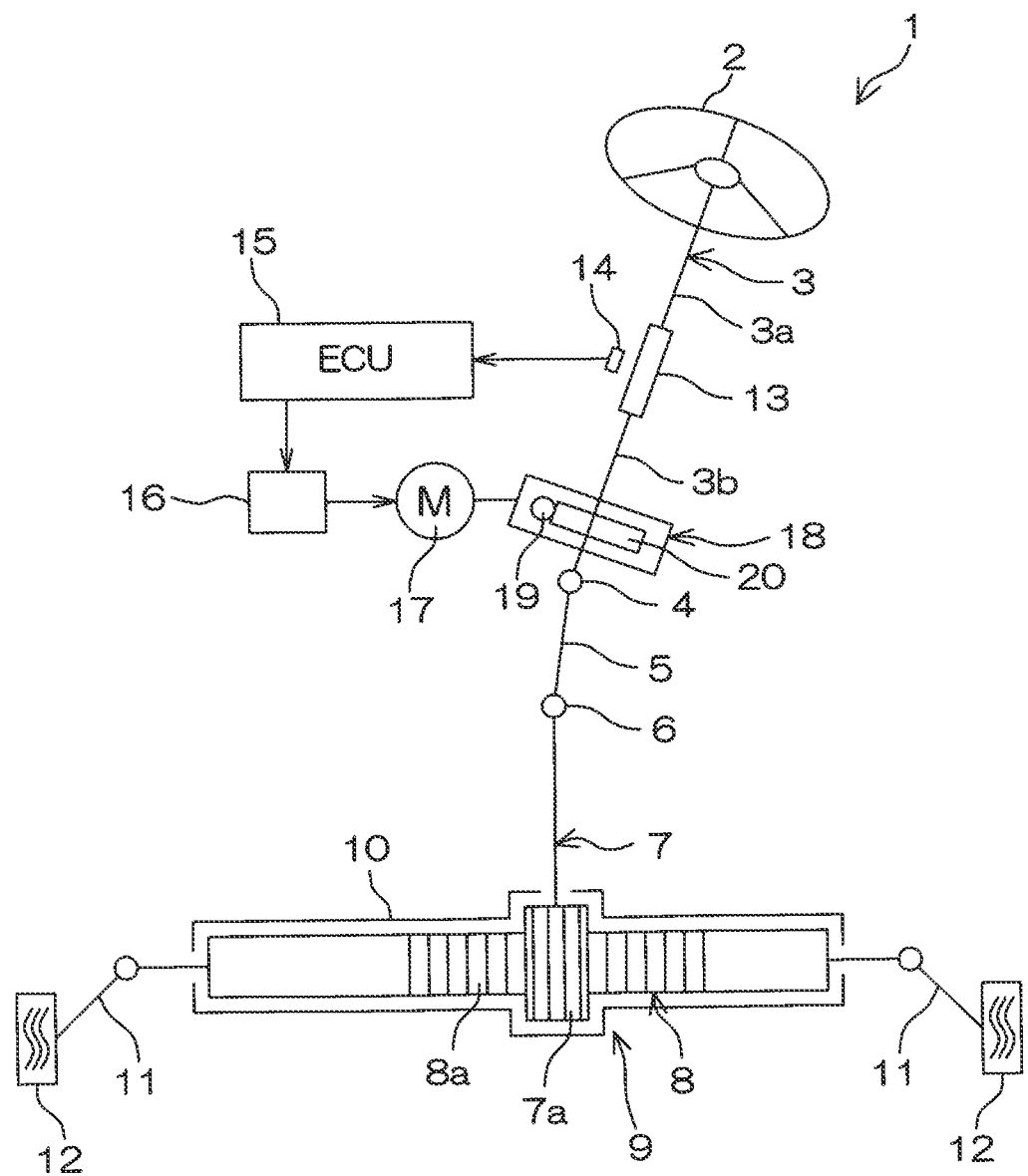
FIG. 1 is a schematic diagram of an electric power steering device according to one embodiment of the present invention.

FIG. 1 is a schematic diagram of an electric power steering device according to one embodiment of the present invention.

Referring to FIG. 1, the electric power steering device 1 includes a steering shaft 3 integrally rotatably connected to a steering wheel 2, an intermediate shaft 5 connected to the steering shaft 3 via a universal joint 4, a pinion shaft 7 connected to the intermediate shaft 5 via a universal joint 6, and a rack bar 8 extending along a lateral direction of a vehicle and having rack teeth 8*a* to be engaged with pinion teeth 7*a* provided on the pinion shaft 7.

The pinion shaft 7 and the rack bar 8 together constitute a steering mechanism 9 including a rack and pinion mechanism.

The rack bar 8 is linearly reciprocatably supported via a plurality of bearings not shown in a rack housing 10 fixed on a body of the vehicle. Both end portions of the rack bar 8 protrude on both sides of the rack housing 10, and are respectively connected to tie rods 11.

Each tie rod 11 is connected to a corresponding steered wheel 12 via a steering knuckle arm not shown.

When the steering wheel 2 is operated to rotate the steering shaft 3, the rotation is converted by the pinion teeth 7a and the rack teeth 8a into linear motion of the rack bar 8 along the lateral direction of the vehicle, so that the steered wheels 12 are steered.

The steering shaft 3 is divided into an input shaft 3a continuous from the steering wheel 2 and an output shaft 3b continuous from the pinion shaft 7, and these shafts 3a and 3b are connected, via a torsion bar 13, to each other to be relatively rotatable on the same axis.

Besides, the torsion bar 13 is provided with a torque sensor 14 for detecting a steering torque based on an amount of relative rotational displacement between the shafts 3a and 3b, and a torque detection result obtained by the torque sensor 14 is given to an ECU (Electric Control Unit) 15.

The ECU 15 controls, via drive circuit 16, drive of an electric motor 17 for steering assistance on the basis of the torque detection result, a vehicle speed detection result given from a speed sensor not shown, and the like. Then, the output rotation of the electric motor 17 is reduced in speed by a reduction gear 18, the resultant rotation is transmitted to the pinion shaft 7 and is converted into the linear motion of the rack bar 8, and thus, the steering is assisted.

The reduction gear 18 includes a pinion 19 serving as an input shaft rotationally driven by the electric motor 17, and a wheel 20 engaged with the pinion 19 and integrally rotatably connected to the output shaft 3b of the steering shaft 3.

Figure 2:
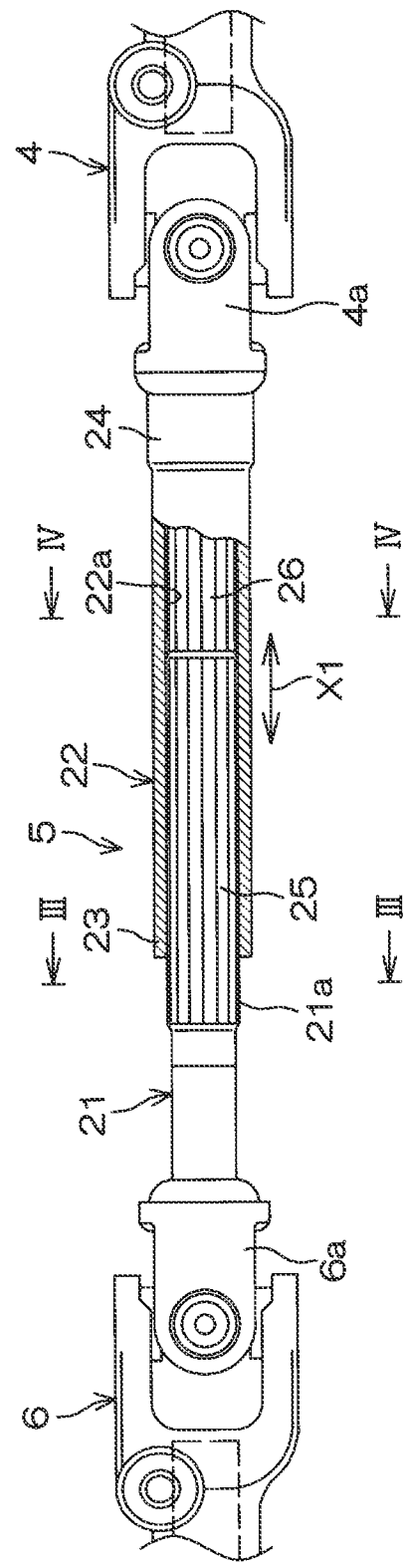
FIG. 2 is a cross-sectional view of a principal part of an intermediate shaft.

FIG. 2 is a cross-sectional view of a principal part of the intermediate shaft.

Referring to FIGS. 1 and 2, the intermediate shaft 5 includes a male shaft 21 corresponding to, for example, a lower shaft, and a cylindrical female shaft 22 corresponding to, for example, an upper shaft.

The upper end of the female shaft 22 is connected to a yoke 4a of the universal joint 4, and the lower end of the male shaft 21 is connected to a yoke 6a of the universal joint 6.

The female shaft 22 includes a first end portion 23 that is an open end, and a second end portion 24 that is a closed end. The second end portion 24 is connected to an end portion of the yoke 4a of the universal joint 4 to be closed.

The male shaft 21 is inserted into the female shaft 22 from the side of the first end portion 23 to be connected thereto slidably along an axial direction X1. Specifically, the male shaft 21 and the female shaft 22 are spline fit.

Figure 3:
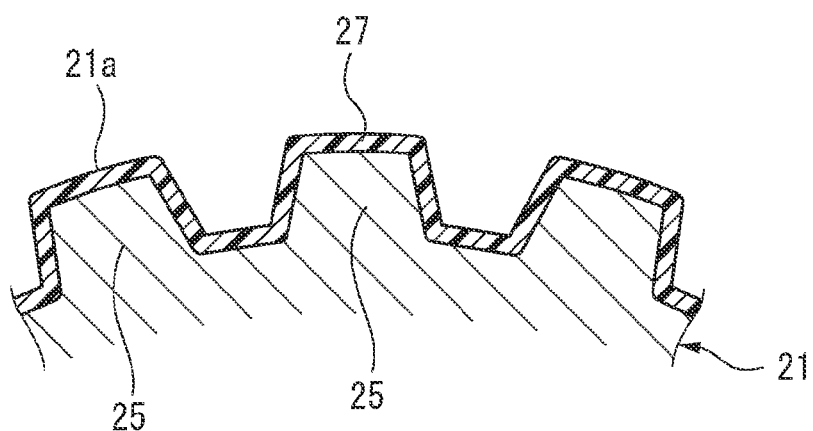
FIG. 3 is a cross-sectional view taken on line III-III of FIG. 2.
Figure 4:
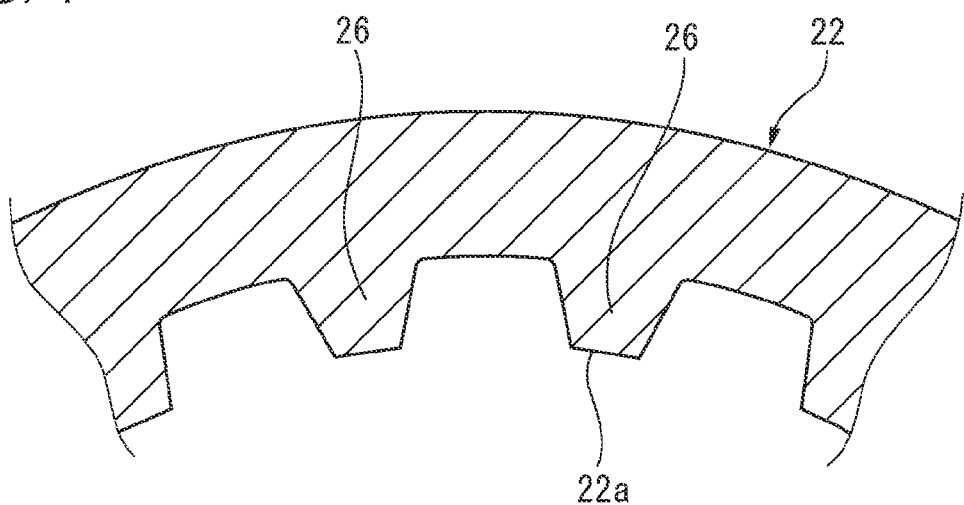
FIG. 4 is a cross-sectional view taken on line IV-IV of FIG. 2.

FIG. 3 is a cross-sectional view taken on line III-III of FIG. 2. Besides, FIG. 4 is a cross-sectional view taken on line IV-IV of FIG. 2.

Referring to FIGS. 2 and 3, an outer circumferential surface 21a of the male shaft 21 has a male spline 25 in parallel to the axial direction X1. Besides, referring to FIGS. 2 and 4, an inner circumferential surface 22a of the female shaft 22 has a female spline 26 in parallel to the axial direction X1 and to be engaged with the male spline 25.

Owing to the engagement between the male spline 25 and the female spline 26, namely, the spline fitting, the male shaft 21 and the female shaft 22 are relatively slidable along the axial direction X1 and capable of accompanying rotation.

Referring to FIG. 3, the outer circumferential surface 21a of the male shaft 21 including the male spline 25 is coated with a resin coating layer 27.

Since the resin coating layer 27 is thus provided, prescribed sliding resistance is given between the male shaft 21 and the female shaft 22, and in addition, a clearance between these shafts 21 and 22 is filled to reduce rattling noise and reduce backlash of the steering wheel 2 occurring in a steering operation.

The resin coating layer 27 is formed by a fluidized bed powder coating method.

Specifically, a powder coating material containing a base resin corresponding to a raw material of the resin coating layer 27 is first placed, in a fluidized bed, in a floating and fluidized state by blowing air or the like.

Subsequently, the male shaft 21 having been heated to a temperature equal to or higher than the melting point of the base resin is immersed in the floating and fluidized powder coating material, and thus, the powder coating material is deposited, and is allowed to melt and flow, on the outer circumferential surface 21a of the male shaft 21, so as to form the resin coating layer 27.

As the powder coating material, one containing the base resin and a specific aliphatic compound is used in the present invention.

As the base resin used for forming the powder coating material, polyamide is suitably used in consideration of providing the resin coating layer 27 with a good sliding property and the like.

In particular, in consideration of providing the resin coating layer 27 with high heat resistance and the like sufficient for use in, for example, an engine room, polyamide 610 is suitably used as the base resin.

Particularly, in the case where polyamide 610 having a large molecular weight is used as the base resin, since the polyamide 610 itself is excellent in wear resistance, the wear resistance of the resin coating layer can be further improved. Besides, the creep resistance of the resin coating layer can be also improved.

The powder coating material can be prepared by using the base resin and the aliphatic compound in the same manner as in a related-art technology. Specifically, the powder coating material can be prepared by crushing a mixture of the aliphatic compound and various additives, if necessary, and classifying the resultant.

As the aliphatic compound, at least one selected from the group including a fatty acid having 14 or more carbon atoms or a derivative thereof, a higher alcohol having 18 or more carbon atoms, an aliphatic amine having 14 or more carbon atoms, and an ester-based wax of a fatty acid having 14 or more carbon atoms is used.

Among these aliphatic compounds, examples of the derivative of a fatty acid include a metal salt and an ester.

Besides, an example of the ester-based wax of a fatty acid includes an ester reaction product of a polyester diol and a fatty acid.

The numbers of carbon atoms of the aliphatic compounds are limited respectively to the aforementioned ranges because those having carbon atoms in number smaller than these ranges are insufficient in the lubricating property, and hence, the above-described effects of reducing the internal friction between molecules of the base resin or of reducing the coefficient of friction against a mating surface cannot be attained.

The lower limit of the number of carbon atoms is different depending on the type of aliphatic compound because the coefficient of friction of a compound itself is different depending on a substituted polar group.

Incidentally, the number of carbon atoms of a fatty acid, a derivative thereof, or an ester-based wax of a fatty acid does not include the number of carbon atoms of a polar group ($—COO^-$), an ester or a polyester diol.

The upper limit of the number of carbon atoms is not especially limited, but in consideration of physical properties, availability and the like of a compound, the number of carbon atoms is preferably 30 or less in any compound.

Particularly in consideration of the lubricating property, stability, availability, handleability and the like, a metal salt of stearic acid is preferably used as the aliphatic compound. Examples of the metal salt of stearic acid include one, two or more of so-called oiliness agents, such as calcium stearate, aluminum stearate, sodium stearate, potassium stearate, magnesium stearate, zinc stearate and lithium stearate.

In particular, one, two or more of calcium stearate, magnesium stearate and magnesium stearate are preferably used.

A mixing ratio of the aliphatic compound is preferably 0.05% by mass or more and 0.5% by mass or less based on an amount of the base resin which is contained in the powder coating material together with the aliphatic compound.

If the mixing ratio of the aliphatic compound is smaller than this range, it is apprehended that the effects, attained by mixing the aliphatic compound, of improving the flowability of the powder coating material when melted, and of improving the wear resistance and the sliding property of the resin coating layer cannot be sufficiently attained. On the other hand, if the ratio exceeds the range, not only an excessive effect cannot be attained but also it is apprehended that the wear resistance and the strength of the resin coating layer are lowered on the contrary.

Incidentally, in consideration of further improving the above-described effects attained by mixing the aliphatic compound, the mixing ratio of the aliphatic compound is preferably 0.1% by mass or more in the above-described range.

Besides, in consideration of preventing the strength and the like of the resin coating layer 27 from being degraded by excessively mixing the aliphatic compound, the mixing ratio of the aliphatic compound is preferably 0.3% by mass or less in the above-described range.

Conditions to be employed for forming the resin coating layer 27 by the fluidized bed powder coating method can be set in the same manner as in a related-art technology.

A base layer may be precedently formed on the outer circumferential surface 21a of the male shaft 21 before forming the resin coating layer 27. An example of such a base layer includes a layer formed by applying a varnish of a curable resin such as an epoxy resin or a polyamide imide resin and curing the resultant.

In particular, if abase layer is combined with the resin coating layer 27 containing polyamide 610 to constitute an intermediate shaft to be used in an engine room required of high heat resistance, the base layer is preferably formed by applying a varnish of a curable resin containing a polyamide imide resin as a base agent and curing the resultant.

The thickness of the resin coating layer 27 may be substantially the same as the clearance between the male shaft 21 and the female shaft 22. Besides, if the base layer is formed, the total thickness of the base layer and the resin coating layer 27 may be substantially the same as the clearance.

For adjusting the thickness, the resin coating layer 27 formed by the fluidized bed powder coating method may be polished.

The resin coating layer may be formed on the inner circumferential surface 22a of the female shaft 22 instead of the outer circumferential surface 21a of the male shaft 21. However, there is no need to form the coating layer on both the surfaces.

The steering device including the sliding shaft as the intermediate shaft 5 is not limited to the column-type electric power steering device illustrated in FIG. 1, but may be another type power steering device or a steering device not having a steering assist function.

The sliding shaft may be applied to, for example, an expandable/contractible shaft or the like used for providing an impact absorbing stroke in a steering device.

In addition, various changes and modifications can be made in design without departing from the scope of the present invention.

EXAMPLES

Examples 1 to 4

Polyamide 610 serving as a base resin was mixed with a prescribed amount of magnesium stearate, the resultant mixture was kneaded and crushed to prepare a powder coating material. The mixing ratio of the magnesium stearate was 0.02% by mass (in Example 1), 0.05% by mass (in Example 2), 0.1% by mass (in Example 3), and 0.3% by mass (in Example 4) based on the amount of the polyamide 610.

Comparative Example 1

Without mixing magnesium stearate, polyamide 610 serving as a base resin alone was crushed to prepare a powder coating material.

<Measurement of Melt Flow Rate>

The melt flow rate (MFR, g/10 min) of the powder coating material prepared in each of the examples and comparative example was measured in accordance with a test method described in Japanese Industrial Standards JIS K7210: 1999 "Plastics—Determination of the melt mass-flow rate (MFR) and the melt volume-flow rate (MVR) of thermoplastics".

Figure 5:
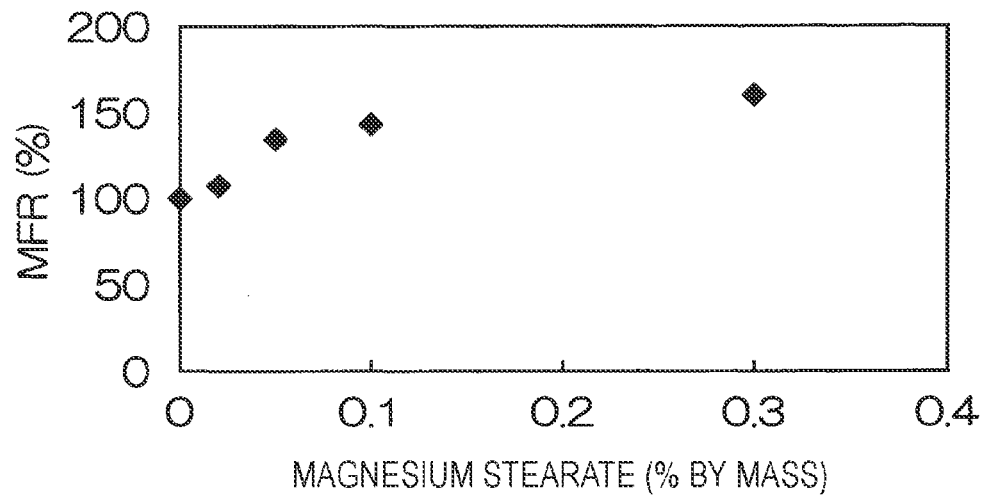
FIG. 5 is a graph illustrating the relationship between a melt flow rate obtained in powder coating materials prepared in Examples 1 to 4 and Comparative Example 1 and a mixing ratio of magnesium stearate.

The relationship between the measured melt flow rate and the mixing ratio (% by mass) of the magnesium stearate is illustrated in FIG. 5. Incidentally, in this drawing, the melt flow rate of each example is shown as a percentage (%) obtained by assuming that the melt flow rate of Comparative Example 1 is 100%.

It was understood from FIG. 5 that the melt flow rate can be increased by mixing the magnesium stearate in the powder coating material as compared with a case where it is not mixed, so as to improve the flowability when melted.

Besides, in consideration of further improving this effect, the mixing ratio of magnesium stearate is preferably 0.05% by mass or more, particularly 0.1% by mass or more, and is preferably 0.5% by mass or less, particularly 0.3% by mass or less based on the amount of the base resin.

<Measurement of Tensile Break Strength>

The powder coating material prepared in each of the examples and comparative example was formed into the shape of a sheet, and the sheet was punched to prepare a type 1 test piece defined in Japanese Industrial Standards JIS K7113-1995 "Tensile test method for plastics". This test piece was used to measure tensile break strength (MPa) under environments of a temperature of 23±2° C. and a relative humidity of 50±5% in accordance with a test method described in the standard.

Figure 6:
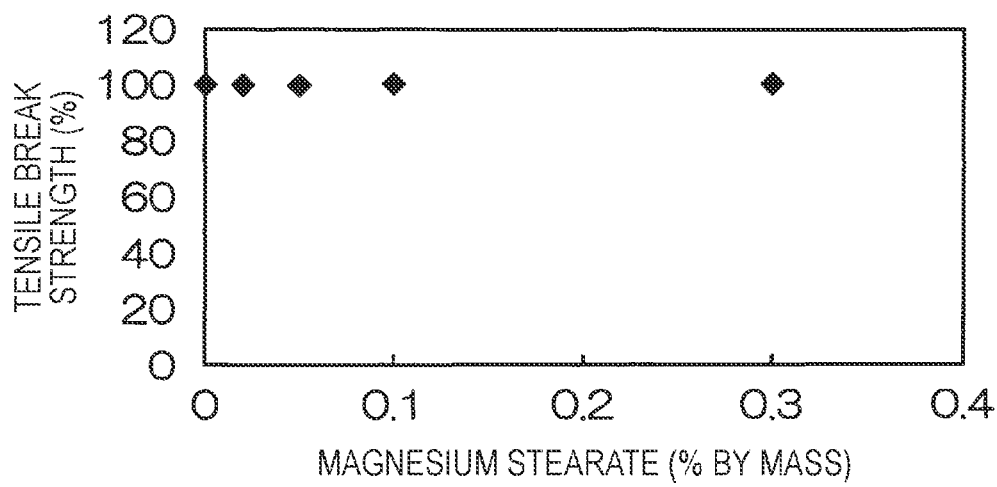
FIG. 6 is a graph illustrating the relationship between a tensile break strength of a test piece containing the powder coating material prepared in each of Examples 1 to 4 and Comparative Example 1 and the mixing ratio of magnesium stearate.

The relationship between the measured tensile break strength and the mixing ratio (% by mass) of magnesium stearate is illustrated in FIG. 6. Incidentally, in this drawing, the tensile break strength of each example is shown as a percentage (%) obtained by assuming that the tensile break strength of Comparative Example 1 is 100%.

It is understood from FIG. 6 that even if magnesium stearate is mixed in the powder coating material, the strength of the test piece containing the powder coating material, and the resin coating layer in the end, is not substantially changed.

<Measurement of Coefficient of Friction>

The powder coating material prepared in each of the examples and comparative example was used as a molding material to prepare a plastic test piece in a plate shape defined in Japanese Industrial Standards JIS K7218 1986 "Testing Methods for Sliding Wear Resistance of Plastics". This test piece was used for performing a friction/wear test under environments of a temperature of 23±2° C. and a relative humidity of 50±5% in accordance with a method A (Suzuki type) described in the standard under conditions of a load of 50 N, a sliding speed of 0.5 m/min, and a time of 10 min, and on the basis of a torque measurement result obtained by a torque detector incorporated into a test apparatus, a coefficient of friction (μ) was obtained. As a mating member, one made of carbon steel S45C was used.

Figure 7:
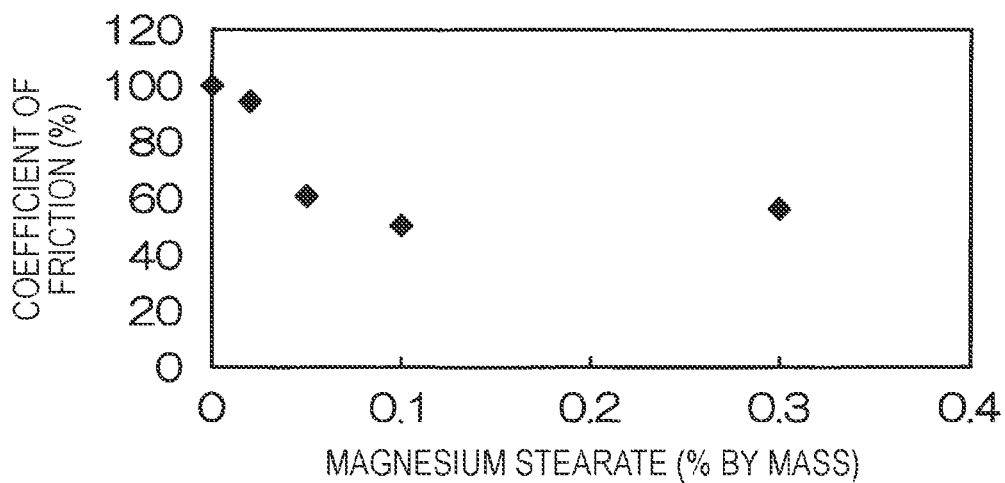
FIG. 7 is a graph illustrating the relationship between a coefficient of friction of a test piece containing the powder coating material prepared in each of Examples 1 to 4 and Comparative Example 1 and the mixing ratio of magnesium stearate.

The relationship between the obtained coefficient of friction and the mixing ratio (% by mass) of magnesium stearate is illustrated in FIG. 7. Incidentally, in this drawing, the coefficient of friction of each example is shown as a percentage (%) obtained by assuming that the coefficient of friction of Comparative Example 1 is 100%.

It is understood from FIG. 7 that the coefficient of friction can be lowered by mixing magnesium stearate in the powder coating material as compared with a case where it is not mixed, so as to improve the wear resistance and the sliding property of the resin coating layer.

Besides, in consideration of further improving this effect, the mixing ratio of magnesium stearate is preferably 0.05% by mass or more, particularly 0.1% by mass or more, and is preferably 0.5% by mass or less, particularly 0.3% by mass or less based on the amount of the base resin.

<Durability Test>

The powder coating material prepared in each of Example 3 and Comparative Example 1 was used to form, by the fluidized bed powder coating method, the resin coating layer 27 on the outer circumferential surface 21a of the male shaft 21 including the male spline 25 of the intermediate shaft 5 illustrated in FIGS. 2 and 3.

Figure 8:
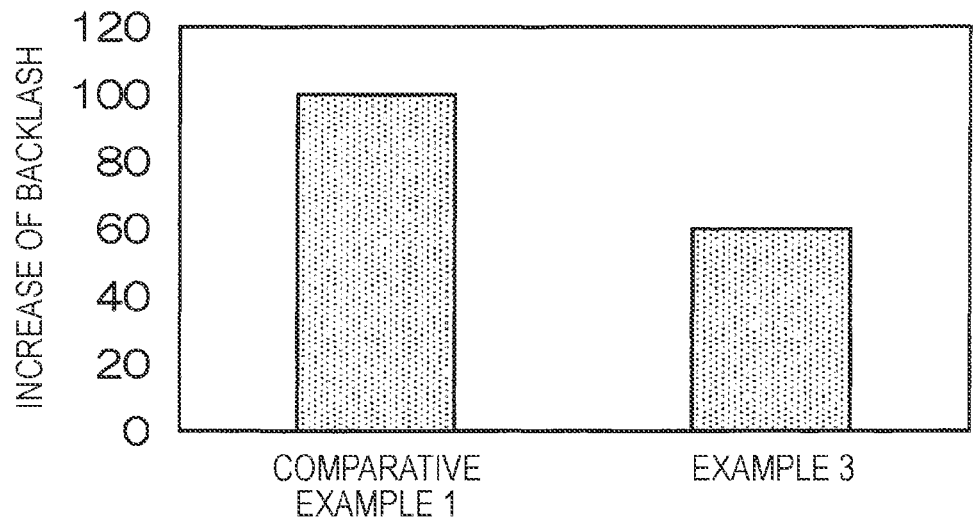
FIG. 8 is a graph illustrating an increase rate of backlash in a resin coating layer formed of the powder coating material prepared in each of Examples 1 to 4 and Comparative Example 1.

Then, the intermediate shaft 5 constituted by combining this male shaft 21 with the female shaft 22 was incorporated into the electric power steering device 1 of FIG. 1, and the durability of the resin coating layer 27 was evaluated by measuring the increase (') of backlash by performing a durability test in which a steering operation was repeated by two million and hundred thousand times under conditions of a stroke of ±2.5 mm×10 Hz, a torque of ±35 Nm×10 Hz (sine wave), and an installation angle of a vehicle angle. The results are illustrated in FIG. 8. Incidentally, in this drawing, the increase of the backlash of Example 3 is shown as a percentage (%) obtained by assuming that the increase of the backlash of Comparative Example 1 is 100%.

It is understood from FIG. 8 that the increase of the backlash can be reduced by mixing magnesium stearate in the powder coating material as compared with a case where it is not mixed, so as to improve the durability of the resin coating layer 27.

Example 5

A powder coating material was prepared in the same manner as in Example 3 except that magnesium stearate was replaced with the same amount of calcium stearate.

Example 6

A powder coating material was prepared in the same manner as in Example 3 except that magnesium stearate was replaced with the same amount of aluminum stearate.

Figure 9:
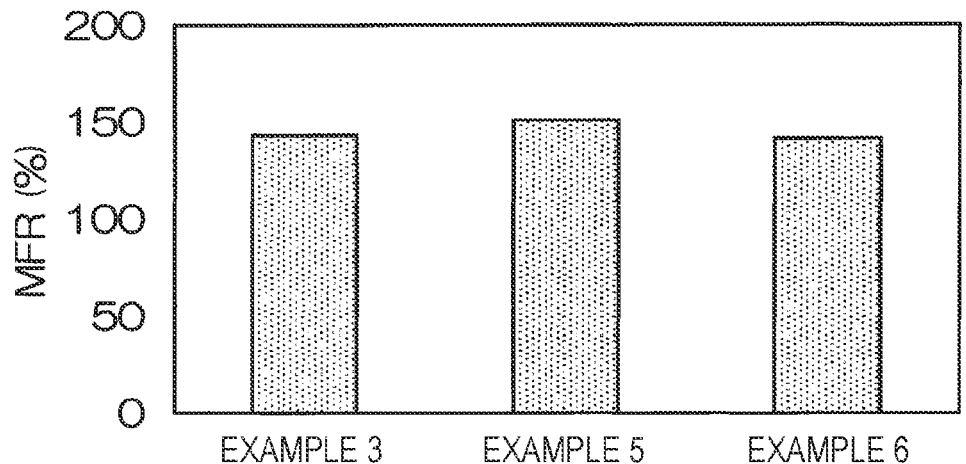
FIG. 9 is a graph illustrating the melt flow rates of powder coating materials prepared in Examples 3, 5 and 6.
Figure 10:
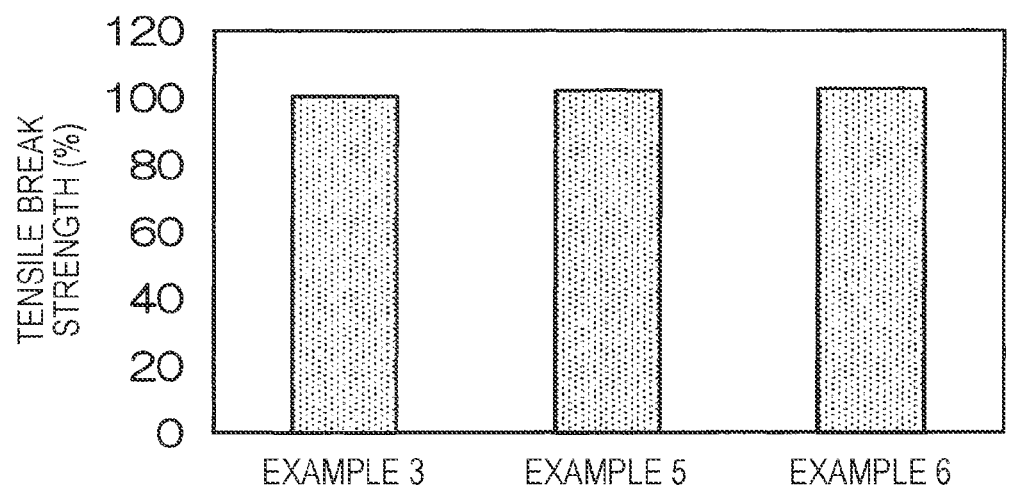
FIG. 10 is a graph illustrating the tensile break strengths of test pieces containing the powder coating materials prepared in Examples 3, 5 and 6.
Figure 11:
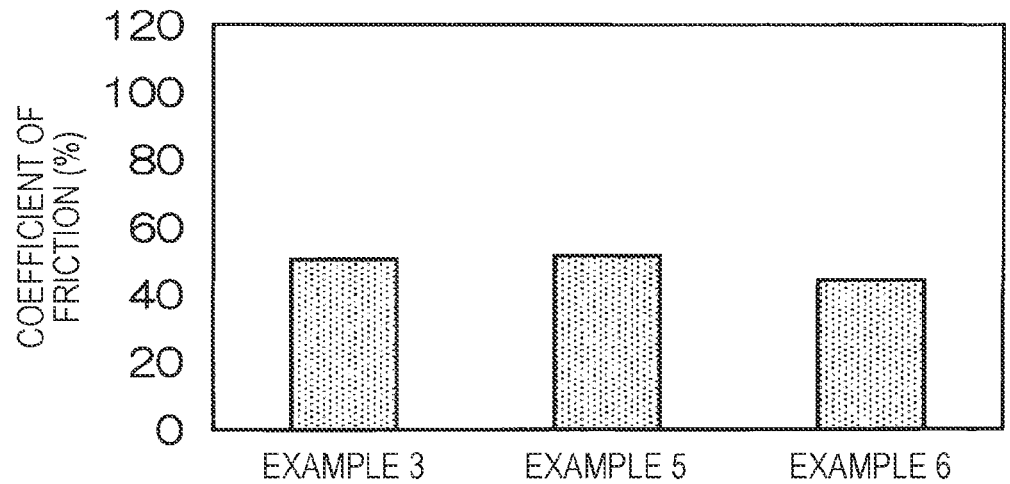
FIG. 11 is a graph illustrating the coefficients of friction of the test pieces containing the powder coating materials prepared in Examples 3, 5 and 6.

The powder coating materials of Examples 5 and 6 were subjected to the measurement of a melt flow rate, the measurement of tensile break strength and the measurement of a coefficient of friction described above. The results of the measurement of a melt flow rate are illustrated in FIG. 9, the results of the measurement of tensile break strength are illustrated in FIG. 10 and the results of the measurement of a coefficient of friction are illustrated in FIG. 11 all together with the results of Example 3.

Incidentally, all the results illustrated in these drawings are shown as a percentage (%) obtained by assuming that the corresponding result of Comparative Example 1 is 100%.

It is understood from the results of these drawings that substantially the same effects can be attained by using not only magnesium stearate but also calcium stearate or aluminum stearate, and that magnesium stearate is particularly preferred.

This application is based upon the prior Japanese patent application (Japanese Patent Application No. 2013-149610), filed on Jul. 18, 2013, the entire contents of which are incorporated herein by reference.

INDUSTRIAL APPLICABILITY

According to the present invention, a sliding shaft including a resin coating layer that is formed, by a fluidized bed powder coating method, to have a sufficient thickness even on, for example, an inner surface of a tooth space between splines where a powder coating material is difficult to enter, and is excellent also in wear resistance can be realized.

DESCRIPTION OF THE REFERENCE NUMERALS AND SIGNS

1: electric power steering device, 2: steering wheel, 3: steering shaft, 3a: input shaft, 3b: output shaft, 4: universal joint, 4a: yoke, 5: intermediate shaft, 6: universal joint, 6a: yoke, 7: pinion shaft, 7a: pinion tooth, 8: rack bar, 8a: rack tooth, 9: steering mechanism, 10: rack housing, 11: tie rod, 12: steered wheel, 13: torsion bar, 14: torque sensor, 15: ECU, 16: drive circuit, 17: electric motor, 18: reduction gear, 19: pinion, 20: wheel, 21: male shaft, 21a: outer circumferential surface, 22: female shaft, 22a: inner circumferential surface, 23: first end portion, 24: second end portion, 25: male spline, 26: female spline, 27: resin coating layer, X1: axial direction

The invention claimed is:

1. A sliding shaft comprising a male shaft and a cylindrical female shaft connected to each other slidably along an axial direction, an outer circumferential surface of the male shaft or an inner circumferential surface of the female shaft being coated with a powder-coated resin layer, wherein the powder-coated resin layer includes a powder coating material and is formed, by a fluidized bed powder coating method, by using the powder coating material, the powder coating material containing:

a base resin; and a fatty acid having 14 or more carbon atoms or a metal salt thereof, and wherein splines to be engaged with each other are respectively formed on the outer circumferential surface of the male shaft and the inner circumferential surface of the female shaft, and the male shaft and the female shaft are connected to each other to be expandable/contractible along the axial direction through engagement of the splines.

2. The sliding shaft according to claim 1, wherein the powder coating material contains the fatty acid or metal salt thereof in a ratio of 0.05% by mass or more and 0.5% by mass or less based on an amount of the base resin.

3. The sliding shaft according to claim 1, wherein the base resin is polyamide.

4. The sliding shaft according to claim 3, wherein the base resin is polyamide 610.

5. A steering device comprising the sliding shaft according to claim 1 as an intermediate shaft transmitting steering force.

\* \* \* \* \*